Nov. 13, 1956  E. H. COOLEY  2,770,773
DETECTING CORROSION OF WELL CASING
Filed Dec. 27, 1954  4 Sheets-Sheet 1

INVENTOR.
ELIHU H. COOLEY
BY Newell Pottof
ATTORNEY

Nov. 13, 1956          E. H. COOLEY          2,770,773

DETECTING CORROSION OF WELL CASING

Filed Dec. 27, 1954          4 Sheets-Sheet 2

INVENTOR.
ELIHU H. COOLEY
BY
ATTORNEY

Nov. 13, 1956 — E. H. COOLEY — 2,770,773
DETECTING CORROSION OF WELL CASING
Filed Dec. 27, 1954 — 4 Sheets-Sheet 3
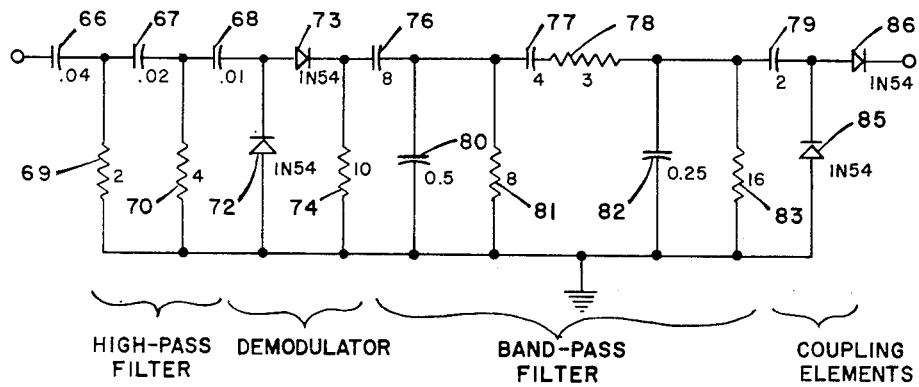
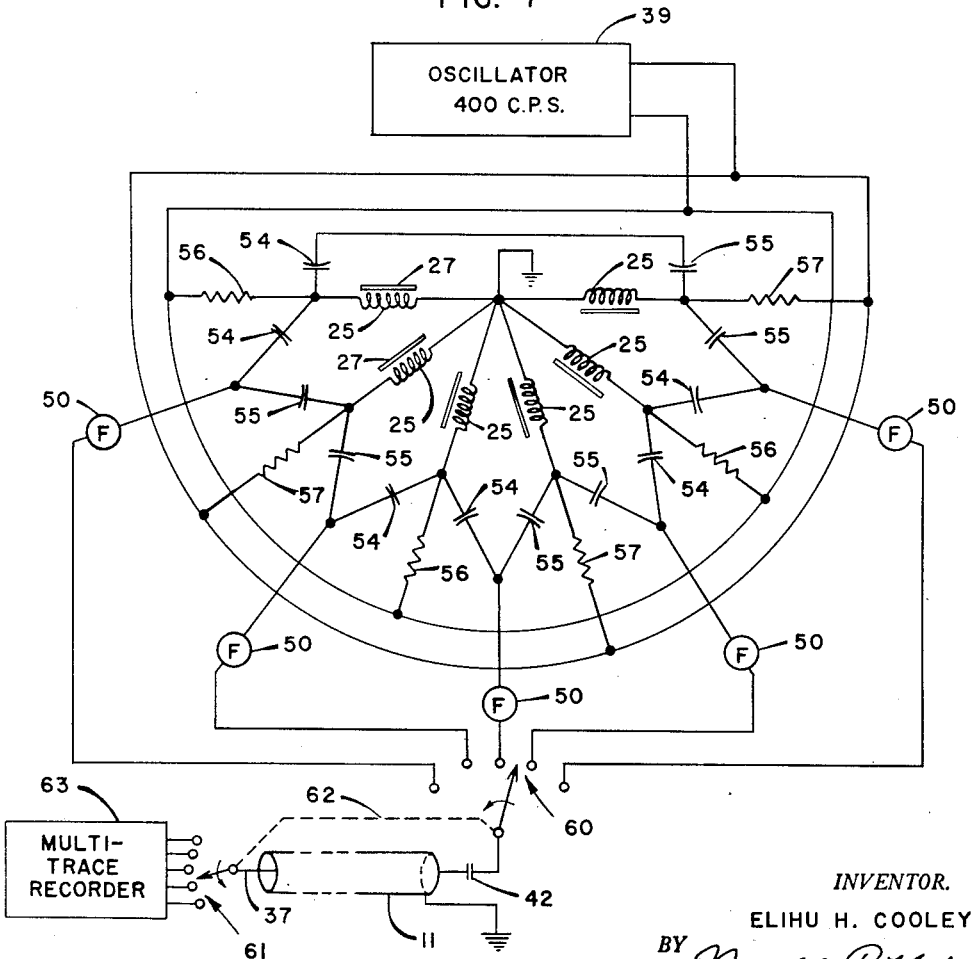
INVENTOR.
ELIHU H. COOLEY
BY Newell Pottoy
ATTORNEY United States Patent Office 2,770,773
Patented Nov. 13, 1956

2,770,773

DETECTING CORROSION OF WELL CASING

Elihu H. Cooley, Tulsa, Okla., assignor to Stanolind Oil and Gas Company, Tulsa, Okla., a corporation of Delaware Application December 27, 1954, Serial No. 477,814

9 Claims. (Cl. 324—37)

This invention relates to the detection of corrosion of pipes such as well casing used in wells which produce oil and gas. In particular, the invention is directed to detecting, by measurements made on the inside of the pipe or casing, the presence of corrosion pits on either the inside or outside surface of the pipe or casing. While the invention will be described as it applies to the detection of corrosion of well casing, it is obviously adaptable by proper design to measurements on almost any kind of ferromagnetic wall of uniform contour, whether flat, cylindrical, or spherical, and convex or concave.

The detection of well-casing corrosion is an important problem as the occurrence of a casing leak may, if undetected, cause considerable damage and is always expensive to repair.

Two important matters for evaluation are the character and the location of occurrence of the corrosion. If the corrosion occurs more or less uniformly over a substantial area of the casing surface, it is often not considered dangerous, as a large amount of metal may be corroded and removed over a long period of time before penetration of the casing wall takes place. On the other hand, if the corrosion is confined to localized small areas or pits, prompt detection and counter-measures are important, as penetration of the casing may occur very rapidly.

If the corrosion occurs on the inside of a pipe or casing, detecting it and taking appropriate corrective action are relatively simple matters. There have been described or are available a number of caliper-type instruments having multiple feeler arms for mechanically measuring the amount of corrosion or the depth of corrosion pits on the inner casing or pipe surface. Once the data concerning the internal surface corrosion are known, the use of corrosion-inhibiting chemicals, coatings, and the like, is largely a matter of routine selection.

The detection of corrosion on the outside of a casing or pipe which is inaccessible to measuring instruments, on the other hand, is a problem that is only partially solved. Sometimes the existence and approximate location of external corrosion can be detected by devices which measure the flow of electric current associated with the corrosion, along the pipe or casing. These devices, however, are generally unable to provide detailed information, as they are ordinarily incapable of distinguishing dangerous corrosion pits from other types of corrosion which may be less dangerous.

It is, therefore, a primary object of my invention to provide a novel and improved method and apparatus for detecting the existence and location of pitting corrosion on the inaccessible outside surfaces of pipes and well casings. Another object is to provide such a method and apparatus which is particularly adapted to indicate the magnitude of pitting corrosion on the outer casing surface. A further object is to provide such a method and apparatus in a form capable of utilizing, for purposes both of power supply and signal transmission, a cable having a single insulated conductor. A still further object is to provide such a method and apparatus which is capable of detecting pitting corrosion regardless of whether or not it is associated with the flow of electric currents. Other and further objects, uses, and advantages of the invention will become apparent as the description proceeds.

Stated briefly, the foregoing and other objects are accomplished by a method and apparatus wherein a short longitudinal section of the casing or pipe is substantially saturated with magnetic flux by applying thereto a steady magnetizing force. Under such a condition, the presence of a corrosion pit or similar defect, regardless of whether it is on the inner or outer surface, creates stray flux which emerges from the casing surface approximately in proportion to the amount of thinning of the casing thickness caused by the corrosion. The interior surface of the casing is, accordingly, scanned by a plurality of closely spaced magnetometer detector elements arranged in electrical bridge-circuit relationships in such a way as to be particularly sensitive to the gradients of the stray flux produced by corrosion pits. In operation, the speed of traverse through a pipe or casing and the sensitivity of the detecting and recording system are so interrelated as to emphasize the effects caused by corrosion pits and differentiate them from instrumental unbalances and other effects.

This will be better understood by reference to the accompanying drawings forming a part of this application and illustrating certain embodiments of the invention. In these drawings, wherein the same reference numerals are applied to the same or corresponding parts in the different figures:

Figure 6 is a detailed wiring diagram of an alternative embodiment of the subsurface detecting system, showing also an alternative transmitting and surface recording arrangement;

Figure 7 is a detailed wiring diagram of a filtering, demodulating, and coupling circuit element employed in the subsurface detecting equipment.

Figures 1, 2, 4:
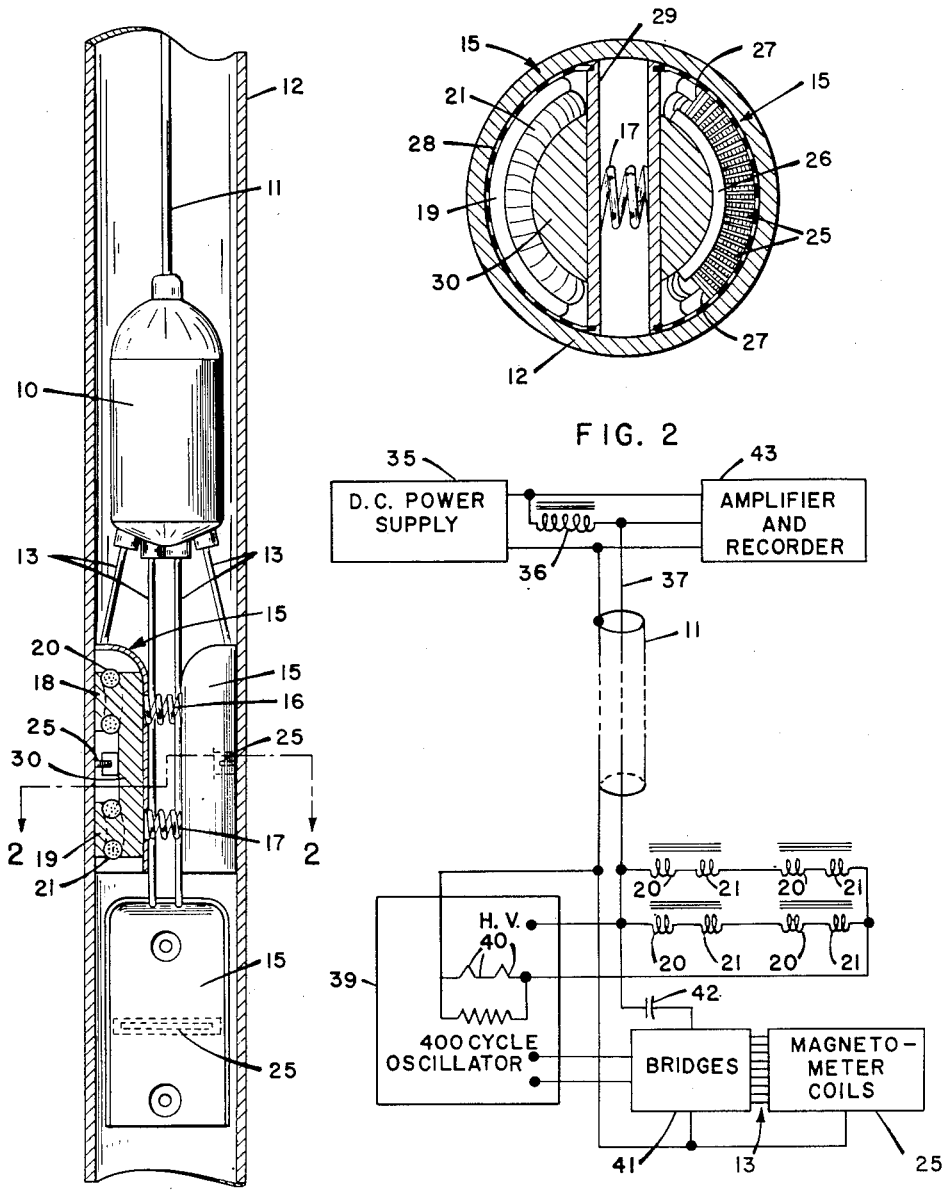
Figure 1 is an elevation view, partially in cross section, showing an instrument embodying the invention in testing position in a well casing.
Figure 2 is an enlarged cross section of the casing and instrument taken along the line 2—2 of Figure 1.
Figure 4 is an overall wiring diagram of the system.

Referring now to these drawings in detail, and particularly to Figure 1 thereof, a housing 10 is shown containing a portion of the subsurface equipment and circuits, the housing 10 being suspended and moved by a cable 11, which has at least one insulated conductor, within a casing 12 to be examined for defects or corrosion pits and shown in cross section. Suspended by multiple-conductor cables 13 from the bottom of the housing 10 are a plurality of scanning shoes 15, preferably four in number and arranged in two pairs, one above and one below. Each of the shoes 15 is adapted to scan about one-quarter of the circumference of the casing 12, and the two shoes 15 of each pair are preferably held apart and pressed outwardly into contact with the inside face of the casing 12 by compression springs 16 and 17.

In Figure 1 one of the bottom pair of shoes 15 has been omitted, and the left-hand shoe of the upper pair is shown in cross section. Thus, as is illustrated by the latter shoe, an armature 30 extending longitudinally through the casing 12 is provided at its ends with a pair of pole pieces 18 and 19 curved to fit closely against the inside contour of the casing. Adjacent each of the pole piece 18 and 19, the armature 30 is surrounded by magnetizing coils or windings 20 and 21 respectively. Located at a position about midway between the pole pieces 18 and 19 is a comb of detecting elements including coils 25 uniformly spaced around an arc which is close to the casing wall and perpendicular to the casing axis. The spacing between adjacent coils 25 in the comb is preferably about the same, or of the same order of magnitude, as the linear dimensions of the pits to be detected. This comb location and orientation places all of the coils 25 as nearly as possible in the magnetic null between the pole pieces 18 and 19. These detecting elements with their coils 25 are particularly adapted to detect any stray flux which enters or leaves the wall of casing 12 due to thinning of the wall by various casing defects or corrosion pits.

As is better shown in Figure 2, which is an enlarged cross section of the casing and the instrument shoes 15 positioned therein, the pole pieces 18 and 19 and the detecting coil elements 25 are covered by and separated from the inside wall of the casing 12 by a thin layer 28 of material, such as fiber or plastic, which takes the abrasion of sliding over the casing surface and is, therefore, expendable and easily replaced. This plastic cover 28 together with a base plate 29, preferably made of a nonmagnetic metal such as brass, form an enclosure for the magnetic saturating means and the means for detecting the stray flux.

Figure 3:
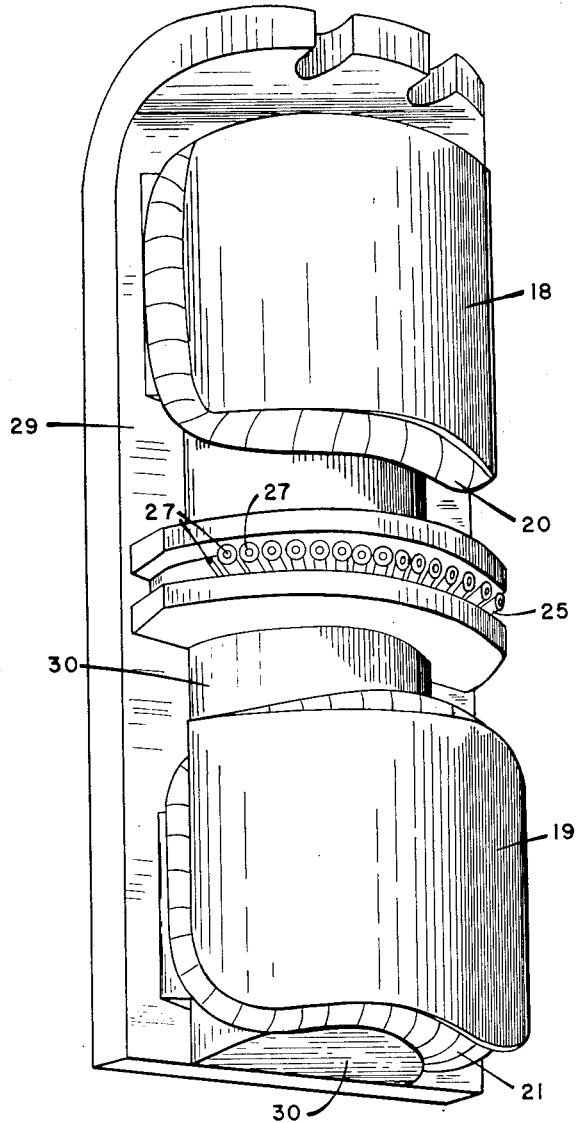
Figure 3 is an elevation view, traced from a photograph, showing the arrangement of the magnetizing and detecting elements in one of the shoe assemblies of Figure 1.

The latter are shown both in Figure 2, and also more clearly in Figure 3 from which the cover 28 has been omitted. Each detector comb comprises, for example, about twenty small cylindrical core pieces 27 oriented radially toward the casing surface and inserted by press-fitting into a supporting base 26. Each of the cores 27 except two, one on each end of the comb, carries a coil or winding 25. Preferably these cores are made of a magnetizable alloy such as Mu-metal which exhibits a very sharp knee or break in its magnetization curve when saturation occurs. By way of example, in one shoe construction embodying the invention, each core 27 was about one-sixteenth inch in diameter and seven-sixteenths of an inch long, and each winding 25 consisted of about 3,000 turns of No. 43 magnet wire. The function of the two cores 27 without windings at the ends of the comb is to reduce as far as possible end effects for the remaining portion of the comb structure having the detector windings 25.

In Figure 4 is shown an overall wiring diagram of this system. At the ground surface, power is taken from a direct-current power supply 35, which is connected through a choke or inductance coil 36 to the insulated conductor 37 of the suspending cable 11. In the shoes 15 at the lower end of cable 11, the direct current supplied over the lead 37 passes through the magnetizing coils 20 and 21 of the various shoes 15, the coils of each pair shoes 15, for example, being connected in series, and the coils of the two pairs of shoes being connected in parallel. At the same time, this magnetizing current may also pass through the filaments 40 of an electronic oscillator circuit 39 of conventional design which supplies alternating current of a suitable frequency, such as 400 cycles per second, to the bridge circuits 41 which include as adjacent arms pairs of the magnetometer coils 25. The output signal or signals from the bridges 41 are then applied, through a blocking or coupling condenser 42, to the insulated lead 37, over which they travel back to the ground surface where they are recorded by an amplifying and recording system 43 of any suitable conventional type. If deisred, the direct-current power supply 35 may also supply the necessary high voltages for operation of the amplifier and recorder 43, as well as the oscillator 39.

Figure 5:
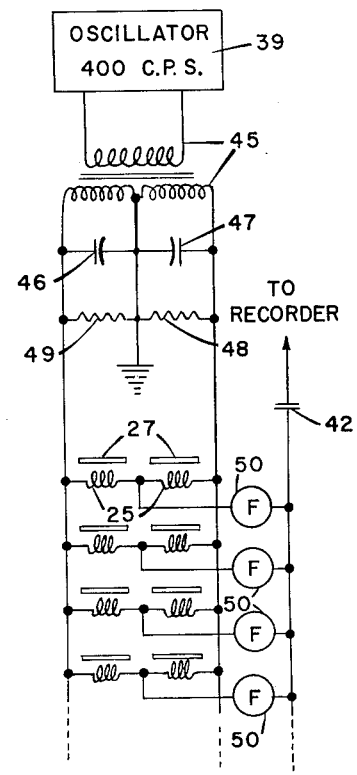
Figure 5 is a detailed wiring diagram showing one embodiment of the detector system located within the subsurface equipment.

A wiring diagram of one embodiment of the detecting system is shown in further detail in Figure 5. All of the detector coils 25 are subdivided into pairs, with each of the two adjacent coils 25 forming a pair being connected in series, and all such pairs being connected in parallel across the secondary of a transformer 45 to which the output of the oscillator 39 is applied. Also connected across the secondary winding of transformer 45 in parallel with the coil pairs are a pair of condensers 46 and 47 in series, and a pair of resistances 48 and 49 in series. The center point of the transformer secondary and the midpoints between the condensers 46 and 47 and between the resistors 48 and 49 are connected to ground.

With this arrangement each pair of detector coils 25 forms one branch of a bridge circuit having the condensers and resistors forming the opposing branch, in parallel. The output due to unbalance of each bridge appears at the midpoint of the corresponding pair of coils 25, and this is connected through a filtering, demodulating, and coupling circuit 50 to a common lead 51, which connects through the coupling condenser 42 to the amplifying and recording circuit 43 of Figure 4. All of the outputs of the filtering, demodulating, and coupling circuits 50 thus being connected together to the single lead 51, a corrosion pit signal appearing anywhere within the detector circuits is transmitted to the recorder 43 without any indication as to which of the pairs of coils is involved.

In Figure 6 is shown a wiring diagram of an alternative embodiment which is somewhat more complex than that of Figure 5 but has certain compensating advantages. In this embodiment, the output of the oscillator 39 is applied through isolation resistors 56 and 57 to the detecting coil bridges, each two of the detecting coils 25 forming one branch of a bridge, with a pair of equal condensers 54 and 55 connected in series forming the other branch of the bridge. The connection of each of the windings 25 is such that it encircles its core 27 in the opposite sense or direction to the winding of the adjacent coils 25. All of the midpoints of the bridge branches formed by the detector coils 25 are connected together and to ground, while the midpoint between the condensers 54 and 55 forming the opposiing bridge branches, being the points where the respective bridge outputs appear, are respectively connected to the filtering and coupling circuits 50.

With this arrangement, it will be seen that, except for the two end coils 25 of each comb assembly, each single detector coil 25 forms an arm of two adjacent bridge circuits. Thus, with these interconnected or overlapping bridge circuits, it is impossible for any defect or corrosion pit of a well casing to be so symmetrically placed as to produce equal and opposite effects in two adjacent bridges, such as may occasionally occur with the embodiment of Figure 5.

For purposes of signal transmission to the recorder, the output of the various filters and coupling circuits 50 is connected to the contact points of a scanning device 60 coupled through the insulated conductor 37 to a distributing device 61 maintained in synchronism with the scanner 60 by a connection 62. The outputs of the distributor 61 are recorded as the various traces of a multiple-trace recorder 63 so that, if desired, information is available as to which of the detecting coils encounters a casing defect or pit.

While the scanning and distributing devices 60 and 61 are illustrated as rotating mechanical switches, it will be understood that in practice these may be entirely electronic in nature, and the synchronizing connection 62 may take the form of electrical signal pulses of a particular character. Obviously it is necessary that the cycling time of devices 60 and 61 must be substantially smaller than the time for traversing a corrosion pit to avoid possibly overlooking it.

It should also be noted that, in place of this system of scanning and multiple-trace recording, the coupling elements 50 of Figure 6 could be connected to a single common lead 51 as in Figure 5 and recorded as a single trace. Likewise, the filters and coupling elements 50 of Figure 5 might be applied to a scanning and multiple-trace recording system of the type shown in Figure 6.

In operation, the subsurface equipment is preferably moved by the suspending cable 11 through the casing 12 at as uniform a speed as possible, such as for example, about 20 feet per minute, while the shoes 15 maintain close contact with the inside surface of the casing. This speed of traverse and the electrical characteristics of the detecting circuits are so interrelated that substantially all bridge output signals are highly attenuated except those generated while moving past corrosion pits or defects. The direct current drawn from the supply 35 magnetizes the casing 12 adjacent the pole pieces 18 and 19 of the various shoes 15 substantially to a condition of magnetic saturation. Thinning of the casing-wall cross section at the location of pits therefore produces an increased amount of flux leakage into the casing interior where the detector coils are exposed to it, regardless of whether the pit is on the inside or the outside casing surface. It is the difference in magnitude of this flux at the locations of two adjacent detector coils 25 which produces an output.

With the various detector coils 25 interconnected in bridge circuits, either as shown in Figure 5 or as in Figure 6, changes in spacing of the detector coils as a group toward or away from the casing wall affects all of the detectors 25 in a similar way, and the resulting unbalance of the various bridges is relatively small. Such unbalances as do occur are further discriminated against by the filtering circuits 50, in that the time during which they occur is normally different from the time for traverse past a corrosion pit.

Likewise, all of the detector elements are similarly and simultaneously affected when passing joints in the casing or defects which extend circumferentially around the casing, or when passing through sections of the casing where thinning of the wall extends over a considerable longitudinal area. These signals, like those due to occasional misfit between the shoe 15 and the casing wall, are largely filtered out by the circuits 50 on the basis of a different time duration from the corrosion-pit signals.

The manner of functioning of the detector cores 27, their windings 25, and the associated bridge circuits is generally well known in the art. The magnitude of the 400-cycle alternating voltage applied to the windings 25 is sufficient to produce saturation of the cores 27. As long as two adjacent cores 27 are exposed to magnetic fields of the same or zero strength, they both reach saturation at substantially the same time in the magnetizing cycle. When one of the two cores 27, however, is in the presence of a magnetic field (such as may be due to stray flux), which does not also equally affect the other, the time of occurrence of saturation of the two cores is different. There is then a resultant output from the associated bridge circuit in the form of a sharp impulse or spike of signal voltage which endures as long as the sharp drop in the inductance of one of the bridge coils 25, due to its core saturation, is not balanced by a corresponding drop in inductance with saturation at the adjacent coil. In general, therefore, the magnitude and duration of these spikes of signal voltage is a measure of the differential or gradient of the stray flux affecting the two coils which are connected in bridge relationship.

There are many causes for unbalance of the various detecting coil bridges besides the flux gradients associated with the corrosion pits. Extensive filtering is thus needed to bring out the significant signals in the presence of signal variations due to misfit of the shoes, changes in separation from the wall, imperfect initial balances of the bridges, and the like. In Figure 7 is shown a wiring diagram of one filter which has been developed to serve this purpose. The small numerals adjacent the circuit elements of this figure are the values of the capacitances in microfarads and of the resistances in thousands of ohms, respectively.

Thus the three series condensers, 66, 67 and 68, in cooperation with the shunt resistors 69 and 70, form a high-pass filter having a lower cut-off frequency at about 4,000 cycles per second. This filter functions effectively to prevent the transmission to the recorder of any of the 400-cycle carrier frequency or its lower harmonics, which may be present as a result of initial unbalances in the bridge circuits as constructed. Since there are many signal-producing variables, such as separation from the casing wall, wall roughness, misfit between the shoe and the casing, and the like, as a practical matter only an approximate initial balance of the various bridges is obtained by making the elements as nearly identical as possible. Residual unbalances are then removed by this high-pass filter.

The output of this filter section then consists essentially only of the very high frequency spikes due to the differential saturation time of any two of the detector cores 27 connected in a bridge circuit, and this output is demodulated by the network consisting of the rectifiers 72 and 73 and the load resistor 74. The resulting demodulated signal is passed through a band-pass filter consisting of the series condensers 76, 77, and 79 and the series resistor 78, which cooperate with shunt capacitances 80 and 82 and shunt resistors 81 and 83. The values of resistance of capacity in this section of the filter are so chosen as to pass frequencies in the band between about 3 and 20 cycles per second, as this is the characteristic frequency range of signals due to the passage of the shoes 15 across a casing corrosion pit at a traverse speed of twenty feet per minute. This frequency band related to the speed of traverse of the instrument 10 through the casing 12 will, of course, be varied to suit any other traverse speed selected.

The output so filtered is then applied to rectifiers 85 and 86, which serve as a unidirectional coupling element to the outputs of similar filters 50 and prevent short-circuiting of energy from one filter output backward into all the others. The output of the filter circuit 50 is thus substantially only the desired signals which are due to the movement of the shoes 15 past casing corrosion pits or defects of similar character.

Figure 8:
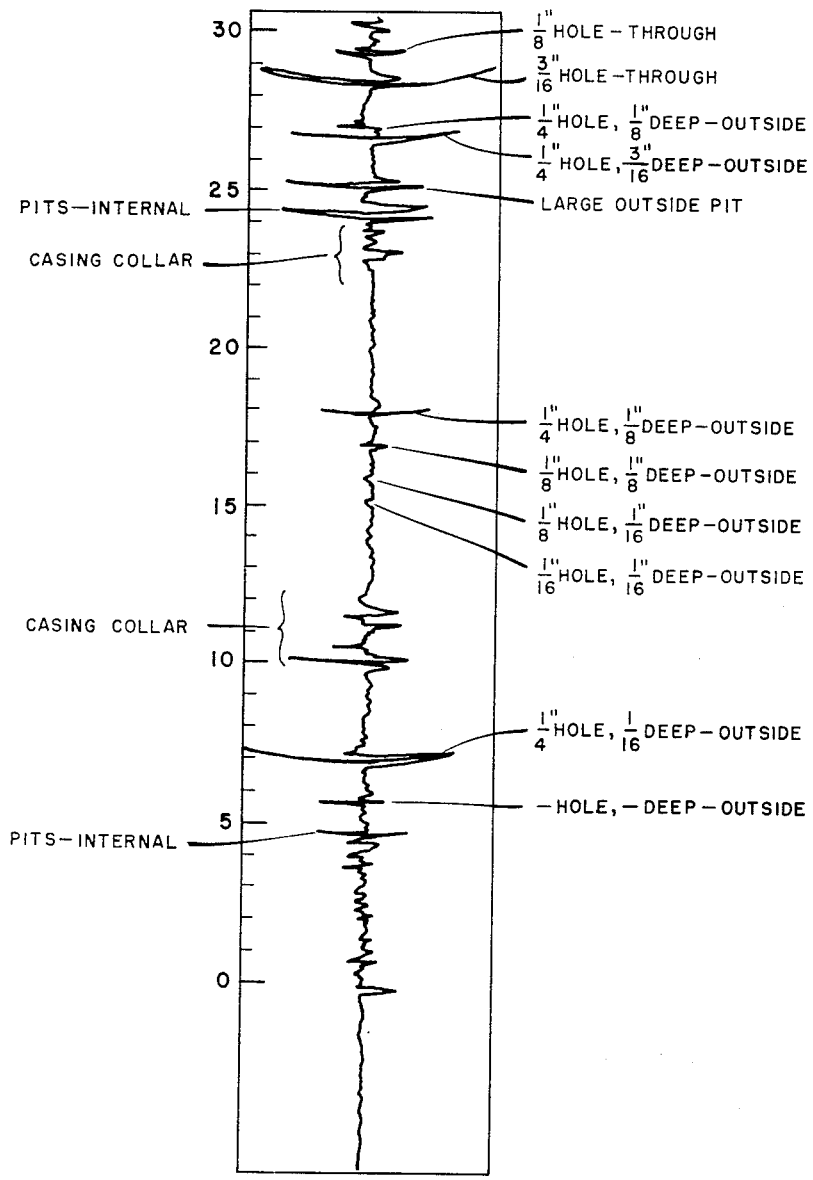
Figure 8 is a tracing made from an actual record showing the response of the system to various types of known or artificially created casing defects or corrosion pits.

In this form the instrument is sensitive to both internal and external corrosion pits. Also, large signals are created in passing casing collars and other irregularities. These latter signals cannot be completely removed, but they can usually be recognized on the resulting records. An example of such a record is shown in Figure 8, which is a tracing of a record that was made by traversing the instrument through a section of casing having known or artificially created defects and using only one pair of the detector elements 27 in a known orientation, so that the specific casing defects and the various signal outputs could be correlated. The thickness of the casing wall was about ¼", and parts of the casing had internal as well as external pits, besides artificially created holes in various dimensions.

In the record shown in Figure 8, the various sizes of internal and external pits and holes are correlated with the responses shown on the drawings. The straight-line portion of the trace at the bottom of the figure shows the low noise level in the detecting and recording circuits with shoes 15 held stationary. The section of casing between the two designated casing collars was nearly new casing without corrosion pits and contained only holes of the various dimensions noted.

It is believed significant that defects as small as ⅛ inch hole of ⅛ inch depth on the outside of the casing were usually detectable, and even smaller or shallower holes might sometimes be detected, depending upon the symmetry of the hole relative to the various detector cores moving past it. In all cases, holes which extended through the casing or nearly so, which would be representative of dangerous corrosion pits apt to cause casing failure, were reliably indicated.

While I have thus described my invention in terms of the foregoing specific embodiments and details, it is to be understood that modifications thereof will occur to those skilled in the art. Thus, by making the pole pieces 18 and 19 with flat, spherical, or concave faces, and correspondingly arranging the detector cores 27 and coils 25 along a straight or inversely-curved line (relative to that illustrated), measurements could be made on the outside or inside of almost any type of ferromagnetic pipe or vessel wall. The invention, therefore, should not be considered as limited to the details described, but its scope is properly to be ascertained from the appended claims.

I claim:

1. In a system for detecting corrosion pits in a ferromagnetic wall, the combination comprising movable means for substantially saturating a portion of said wall with a steady magnetic flux aligned generally in the direction for movement of said means along said wall, a plurality of stray-flux-responsive means spaced along a line adjacent said wall about midway of said saturating means and perpendicular to said direction of movement, each of said flux-responsive means including a coil, a plurality of electrical bridge circuits each having four arms and including two of said coils as adjacent arms in said each bridge circuit, means independent of said saturating means for energizing said bridge circuits to produce electrical output voltages therefrom which include signal pulses proportional to the gradients of flux affecting the two flux-responsive means associated with said two coils in each bridge circuit, means for selecting from said electrical output voltages those signal pulses which vary with a periodicity characteristic of the rate of movement of said flux-responsive means past a corrosion pit in said wall, and means for indicating the variations in the selected signal pulses.

2. In a system for detecting corrosion pits in a cylindrical ferromagnetic wall such as a well casing, the combination comprising a ferromagnetic armature parallel to the cylindrical axis of said wall having at its ends pole pieces shaped to fit the contour of said wall, at least one magnetizing-current winding on said armature and a source of direct current connected to said winding, whereby a steady magnetic flux can be created which substantially saturates the portion of said wall adjacent and between said pole pieces, a plurality of magnetic-flux-responsive elements about midway between said pole pieces spaced along an arc adjacent said wall and perpendicular to said cylindrical axis, each of said flux-responsive elements including a coil, a plurality of electrical bridge circuits each having two of said coils in adjacent impedance arms, a source of alternating current connected across one diagonal of each of said bridge circuits, a plurality of filtering and demodulating circuits, each connected across the other diagonal of one of said bridge circuits, each of said filtering and demodulating circuits being adapted to select and transmit substantially only those output signals of said bridge circuit having characteristics of frequency and amplitude variation which are related to the rate of movement of said flux-responsive elements past corrosion pits at a given speed, and means for producing an indication of the variations in output of said filtering and demodulating circuits.

3. A combination as in claim 2 wherein said pole pieces are shaped to fit the inside contour of said wall, and said magnetic-flux-responsive elements are spaced along an arc adjacent the inside wall surface.

4. A combination as in claim 3 wherein said flux-responsive elements comprise radially oriented, cylindrical cores of a highly permeable ferromagnetic alloy which becomes magnetically saturated with the application of a very small increment of magnetizing force.

5. A combination as in claim 4 wherein each two of said coils is connected in series to form a pair, and the coil pairs so formed are connected in parallel across said alternating current source.

6. A combination as in claim 4 wherein each of said coils forms an impedance arm of two adjacent and overlapping bridge circuits, and including isolation resistors connected between said alternating current source and the power input terminals of each bridge circuit.

7. A combination as in claim 4 wherein said filtering and demodulating circuits are adapted to select primarily only individual signal pulses of more than 4000 cycles per second effective frequency, which vary in amplitude at a rate corresponding to frequencies in the range from about 3 to 20 cycles per second.

8. A combination as in claim 4 wherein all of said filtering and demodulating circuits have their outputs connected together and to the input of a single-trace recorder.

9. A combination as in claim 4 wherein the outputs of said filtering and demodulating circuits are respectively connected to different input channels of a multiple-trace recorder.

References Cited in the file of this patent

UNITED STATES PATENTS

| | | |
|---|---|---|
| Re. 15,859 | Burrows | June 17, 1924 |
| 2,011,665 | Watts | Aug. 20, 1935 |
| 2,124,579 | Knerr et al. | July 26, 1938 |
| 2,455,792 | Meunier | Dec. 7, 1948 |
| 2,650,340 | Lloyd | Aug. 25, 1953 |